United States Patent [19]
Ideker, Jr.

[11] Patent Number: 5,400,543
[45] Date of Patent: Mar. 28, 1995

[54] APPARATUS AND METHOD FOR CAPTURING AND EXTERMINATING FIRE ANTS

[76] Inventor: Dwane R. Ideker, Jr., 3909 Wyldwood Rd., Austin, Tex. 78739

[21] Appl. No.: 217,939

[22] Filed: Mar. 25, 1994

[51] Int. Cl.⁶ .............................................. A01M 5/02
[52] U.S. Cl. ...................... 43/139; 15/330; 134/21
[58] Field of Search .................. 43/124, 139; 15/346, 15/330, 352; 134/21, 26

[56] References Cited

U.S. PATENT DOCUMENTS

| | | | |
|---|---|---|---|
| 2,201,463 | 5/1940 | Williams et al. | 43/140 |
| 2,346,270 | 4/1944 | Nisbet | 43/141 |
| 2,517,292 | 8/1950 | Dewey | 43/142 |
| 2,608,023 | 8/1952 | Dillon | 43/140 |
| 2,643,482 | 6/1953 | Wilson | 43/140 |
| 2,722,082 | 11/1955 | Nisbet et al. | 43/141 |
| 3,750,327 | 8/1973 | Thybault | 43/139 |
| 4,141,174 | 2/1979 | Smith | 43/139 |
| 4,683,673 | 8/1987 | Taylor | 43/139 |
| 4,768,306 | 9/1988 | Hilbun | 43/125 |
| 4,825,582 | 5/1989 | Szynai | 43/140 |
| 5,116,219 | 5/1992 | Zimmerman | 43/139 |
| 5,117,578 | 6/1992 | Theis | 43/140 |
| 5,154,018 | 10/1992 | Livingston | 43/125 |
| 5,182,834 | 2/1993 | Wright et al. | 15/330 |
| 5,214,876 | 6/1993 | Sukup | 43/140 |
| 5,222,322 | 6/1993 | Mastromonaco | 43/139 |
| 5,241,779 | 9/1993 | Lee | 43/139 |
| 5,365,692 | 11/1994 | Gustafson | 43/124 |

*Primary Examiner*—P. Austin Bradley
*Assistant Examiner*—Jeanne M. Elpel
*Attorney, Agent, or Firm*—Shaffer & Culbertson

[57] ABSTRACT

A device for capturing and exterminating fire ants includes a container, a primary vacuum unit, and an inlet hose. The primary vacuum unit reduces the air pressure within the container such that air is drawn in through the inlet hose. During a collection operation, a user operates the digging attachment to loosen a fire ant mound and collects the mound contents with the inlet hose. Once the collection operation is completed, the user seals all openings to the container against the atmosphere and connects a secondary vacuum source to a vacuum receiving nipple formed in the container. The secondary vacuum source removes air from the container and asphyxiates the fire ants within the container. The present invention also includes a digging attachment attachable to the inlet hose that allows a user to loosen the contents of a fire ant mound for more effective collection. Further included are intake clearing buttons for clearing a rigid curved central portion of the inlet hose that tends to accumulate dirt and debris during the collection operation. The present invention also includes a method for capturing and asphyxiating fire ants.

5 Claims, 2 Drawing Sheets

APPARATUS AND METHOD FOR CAPTURING AND EXTERMINATING FIRE ANTS

BACKGROUND OF THE INVENTION

This invention relates to the capture and extermination of fire ants (*solenopsis invicta*). More particularly, this invention relates to a device that employs suction to collect fire ants and a partial vacuum to asphyxiate the ants.

Since unintentionally introduced into the United States, fire ants have proliferated and spread across a large portion of the southern states. Typically, fire ants live in the ground in mounds which they construct of dirt and other loose materials. These mounds usually extend above the earth's surface and also include tunnels that extend below the earth's surface. Fire ants are particularly dangerous to children and small animals that step onto the mounds and receive multiple fire ant stings. Fire ant stings are generally painful, often become infected, and are particularly dangerous to those that are allergic to the fire ant venom.

A variety of techniques have been employed in an attempt to exterminate fire ants and to cause the fire ants to move to another location. Chemicals have been used for many years to kill fire ants and prevent their reproduction. Recent awareness of the environmental dangers associated with these chemicals, however, have severely limited the use of these chemicals. Therefore, extermination devices have been directed towards the capture and extermination of fire ants without disbursing chemicals into the earth.

A device described in U.S. Pat. No. 4,683,673 to Taylor uses a vacuum to collect the fire ants along with a portion of the mound containing the ants and a hammer mill to crush the ants. However, because fire ants have relatively small and durable bodies that are approximately equal in size to the size of the granules of dirt forming the mounds, the mill described in the Taylor patent was ineffective in exterminating the ants collected. Resultantly, the still living fire ants ejected from the device would simply repopulate the mound.

Another device, described in U.S. Pat. No. 5,214,876 to Sukup, used a vacuum to capture insects and a pesticide to exterminate the captured insects after they were captured. This device when applied to fire ant collection extermination the device was ineffective, however. Because the fire ant collection process requires collecting a portion of the mound, using a pesticide to exterminate the fire ants pollutes the collected portion of the mound.

Still another device, described in U.S. Pat. No. 5,116,219 to Zimmerman, employs a vacuum to capture insects and a fluid to drown the captured insects. U.S. Pat. No. 5,241,779 to Lee describes a device that uses a vacuum to capture insects and electricity to kill the captured insects. Because the capture of fire ants necessarily requires that a portion of the fire ant mound also be collected, however, the use of electricity or fluid for extermination purposes would be ineffective.

Another problem associated with collecting fire ants relates to the behavior of the fire ants themselves. When there are vibrations near the mound or the mound is physically disrupted, the fire ants react defensively. During this defensive reaction process, a number of the fire ants in the mound, including the queen, retreat into the underground tunnels of the mound while the remainder of the fire ants remain in the upper portion of the mound to defend the mound. However, in order to exterminate the mound, the queen must be collected and killed along with a large percentage of the ants in the mound. Therefore, the collection device must be relatively silent as it approaches the mound so as to not elicit defensive behavior from the ants until the collection operation begins. Prior devices have not overcome this hurdle. The device described in U.S. Pat. No. 4,683,673 to Taylor, for example, is mounted on a farm tractor. When the tractor approaches the mound the mound vibrates and the fire ants react defensively well before the device can operate on the mound.

SUMMARY OF THE INVENTION

It is therefore a general object of the invention to overcome the above described limitations and others of the prior fire ant collection and extermination devices. Particularly, it is an object of the invention to provide a device that may be used to approach a fire ant mound without triggering the fire ants' defensive response. It is further an object of this invention to provide a device for capturing a significant portion of the fire ants in a mound including the queen fire ant. Finally, it is an object of this invention to provide a device capable of exterminating the captured fire ants without harming the environment.

To accomplish these objects, a fire ant collection and extermination device includes a rigid hollow container, a primary vacuum unit, and an inlet hose to which a digging attachment attaches. Preferably, the container is formed of metal and is removably mounted on a carriage. Construction in this manner allows a full container to be removed from the carriage and another container to be mounted upon the carriage for further collection. The carriage allows the extermination device to be positioned near a fire ant mound without triggering the defensive response of the fire ants in the mound. The primary vacuum unit preferably mounts atop the container and draws air from inside the container so as to create a vacuum within the container. An outlet opening formed on the primary vacuum unit allows air to exit from the primary vacuum unit. An inlet opening formed in a wall of the container connects to a first end of the inlet hose so that air is drawn in through a second end of the inlet hose, out the first end of the inlet hose, and into the container. The digging attachment allows a user to loosen up the dirt in the mound so the device may collect as much of the mound as possible.

In order to exterminate the fire ants contained within the collected material, the device is capable of holding a vacuum within the container to asphyxiate the fire ants. Means for sealing the inlet opening and the outlet opening associated with the primary vacuum unit seal the container against the atmosphere. Preferably the container includes a vacuum receiving nipple which connects to an external vacuum source to remove a substantial portion of the air from within the container. Creating a vacuum within the container effectively exterminates the fire ants without polluting the contents of the container. Therefore, once the fire ants have been exterminated, the remains may be used as a soil additive, for gardening, or may be used to fill the hole left in the ground where mound contents were removed.

In a preferred embodiment, the inlet hose attaches to the vacuum container at an upper portion of the container, the inlet hose bending near where it connects to the container. This curved portion collects dirt and debris during the collection operation and may become clogged if the mound has a high moisture content. Thus, the present invention includes inlet clearing buttons that allow a user to clear the curved portion without removing the inlet hose from the container, and thus allow a user to continue on with the treatment.

These and other objects, advantages, and features of the invention will be apparent from the following description of the preferred embodiments, considered along with the accompanying drawings.

DESCRIPTION OF THE PREFERRED EMBODIMENT

Figure 1:
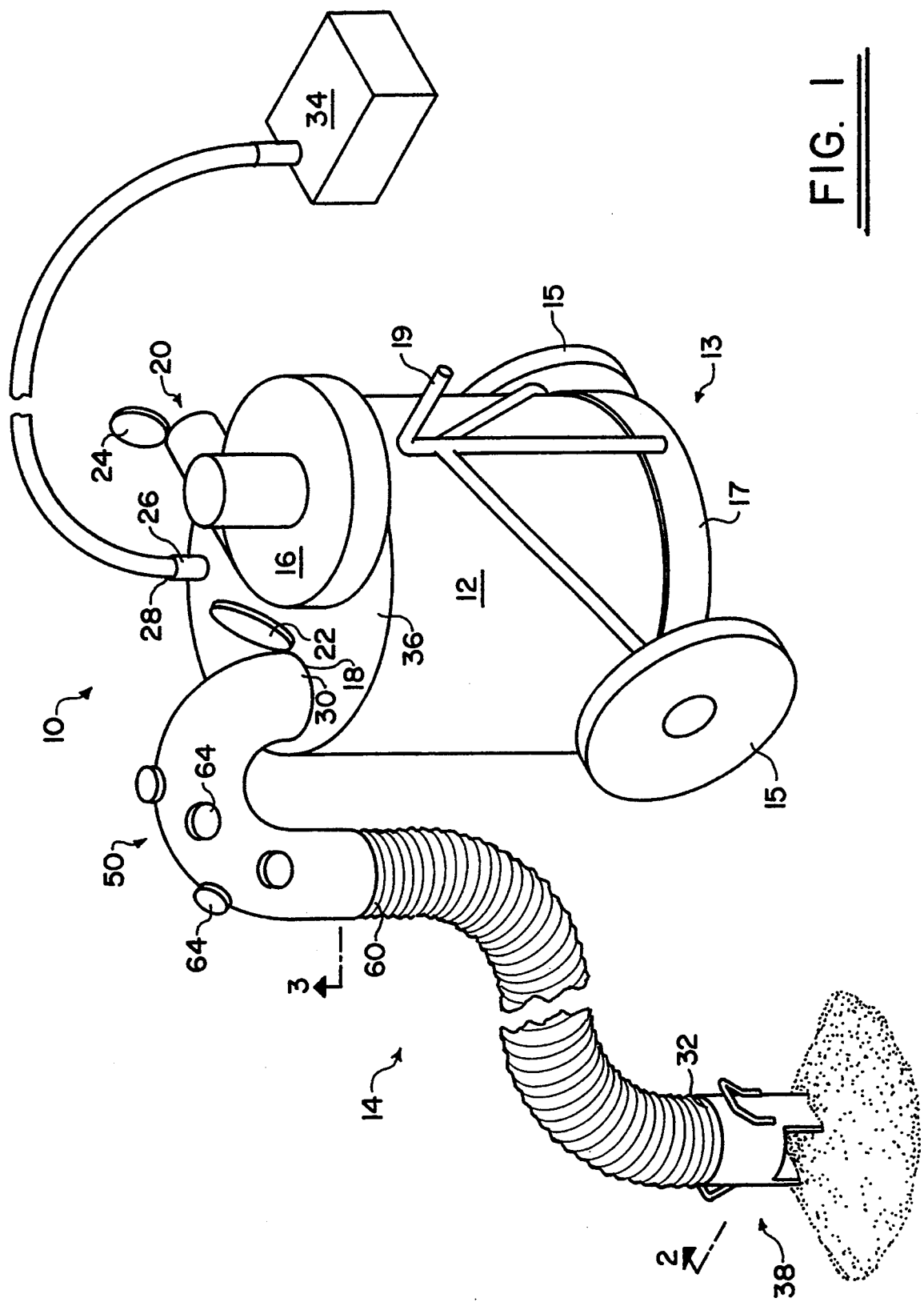
FIG. 1 is a mostly diagrammatic perspective view of a preferred embodiment of an apparatus incorporating the principles of the present invention.
Figure 3:
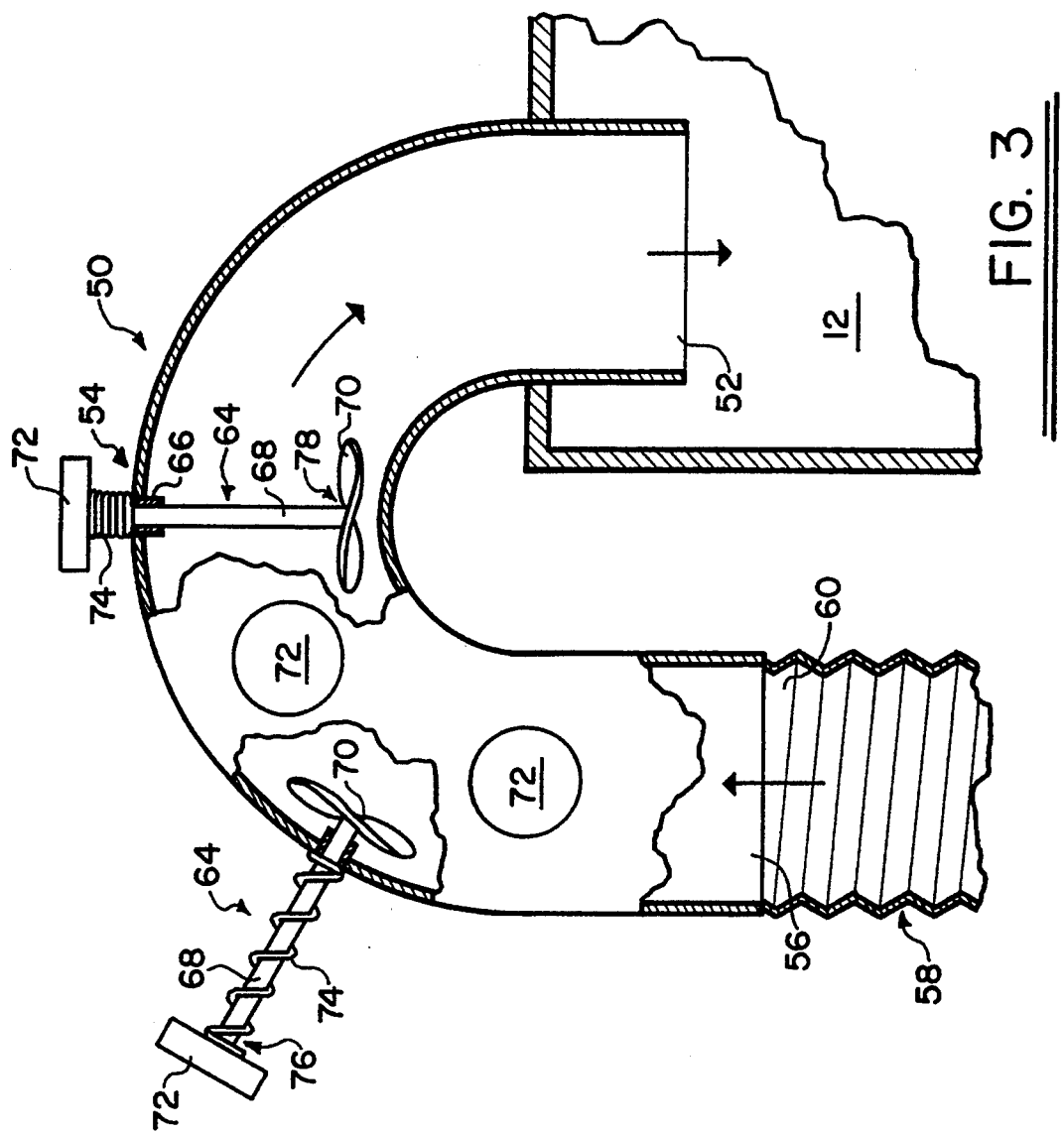
FIG. 3 is a partial longitudinal section view taken along line 3—3 of FIG. 1 and partially broken away to detail the intake arrangement of the present invention.
Figure 2:
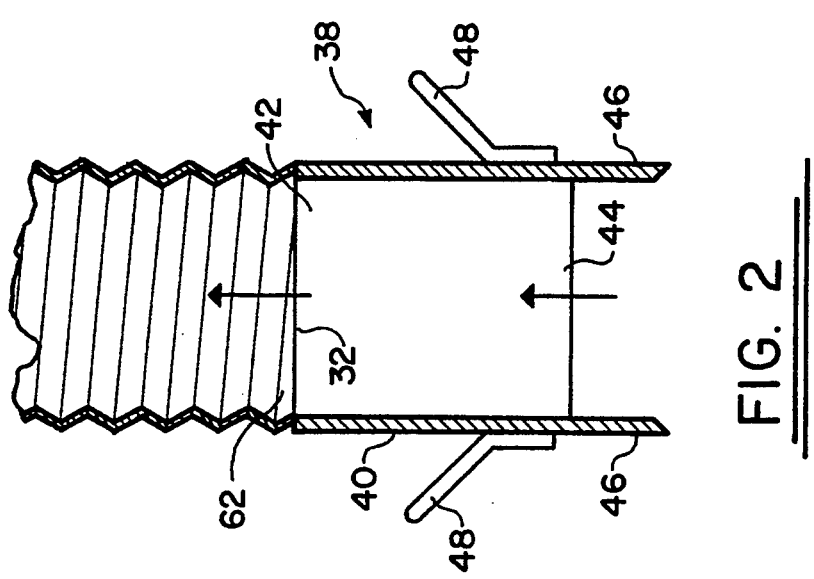
FIG. 2 is a mostly diagrammatic partial section view taken along line 2—2 of FIG. 1 detailing a digging attachment associated with the preferred embodiment of the apparatus of the present invention.

A fire ant collection and extermination device 10 embodying the principles of the present invention is shown by way of illustration in FIGS. 1-3. Referring to FIG. 1, the device 10 comprises a container 12, an inlet hose 14, and a primary vacuum unit 16.

The container 12 preferably is constructed of a lightweight metal such as aluminum and mounted upon a carriage 13 for ease in transport. The carriage 13 comprises two large wheels 15 rotatably mounted on a rigid frame 17 such that a user may grasp a carriage handle 19 to pull the carriage. Constructed in this manner, the carriage 13 allows a single user to easily move the heavy container 12 along and all of the other components of the device 10 adjacent to a fire ant mound without disturbing the fire ants and eliciting a defensive behavior from the fire ants.

Formed on the container 12, an inlet opening 18 sealably connects the inlet hose 14 to the container. An outlet opening 20, formed on the primary vacuum unit 16, allows air to exit from the primary vacuum unit during a collection operation. Inlet sealing means 22 and outlet sealing means 24 operate to substantially seal the inlet opening 18 and the outlet opening 20 respectively during an extermination operation. A vacuum receiving nipple 26 allows a vacuum to be applied to the container 12 during an extermination operation while nipple sealing means 28 operate to seal the vacuum receiving nipple during a collection operation.

During a collection operation, the primary vacuum unit 16 operates to create a vacuum within the container 12. The electrically powered primary vacuum unit 16 may be easily started and stopped to quickly generate a significant vacuum within the container 12. The vacuum within the container 12 causes air to enter the container through the inlet opening 18 which is formed in a wall of the container. Because the inlet opening 18 sealably connects to a first end 30 of the inlet hose 14, the vacuum within the container 12 causes air to be drawn in through a second end 32 of the inlet hose, pass through the inlet hose, and enter the container. The outlet opening 20, formed on the primary vacuum unit 16 allows air to escape from the primary vacuum unit.

During the collection operation, the nipple sealing means 28, preferably a one-way valve, seals the vacuum receiving nipple 26 to prevent air from entering the container 12 through the vacuum receiving nipple. The device 10 therefore allows a user to collect fire ants and a portion of the mound in which they live through the second end 32 of the inlet hose 14. The fire ants and the mound are then retained in the container 12.

During an extermination operation, the inlet sealing means 22 seals the inlet opening 18 to become airtight and the outlet sealing means 24 seals the outlet opening 20 to become airtight. A user then attaches a secondary vacuum source 34 to the vacuum receiving nipple 26, the nipple sealing means 28 allows air to pass through the vacuum receiving nipple, and the secondary vacuum source 34 reduces the air pressure within the container 12. Over a short period of time, depending upon the vacuum source 34, enough air is removed from the interior of the container 12 so that the ants within the container asphyxiate. Once the fire ants have been exterminated, a top 36 of the container 12 may be removed to access the container 12 contents.

Referring now to FIGS. 1 and 2, the apparatus of the present invention preferably includes a digging attachment 38 that facilitates a more effective collection of the fire ants and the mound. The digging attachment includes a rigid and substantially cylindrically shaped hollow body 40 having a first end that is sealably attachable to the second end 32 of the inlet hose 14. Extending from a second end 44 of the rigid body 40 are blades 46 that allow a user to dig up the fire ant mound so that it may pass through the inlet hose 14. Handles 48, attached to the rigid body 40, allow the user to manipulate the rigid body and loosen the mound with the blades 46.

Referring now to FIGS. 1, 2, and 3, in the preferred form of the apparatus of the present invention, the inlet hose 14 comprises a hollow and rigid upper section 50 having a first end 52 connected to the inlet opening 18 of the container 12, a curved central portion 54, and a second end 56 opposite the first end. Further, preferably, a flexible portion 58 of the inlet hose 14 sealably attaches at a first end 60 to the second end 56 of the rigid upper portion and attaches at second end 62 to the digging attachment 38. Constructed in this fashion, dirt and debris sucked in through the inlet hose 14 builds up on the curved central portion 54 of the inlet hose.

Because the mound is typically moist, over a relatively short period of time, the curved central portion 54 may clog with dirt buildup and thereby halt the collection operation. Therefore, the preferred form of the present invention shown particularly in FIG. 3 includes a plurality of inlet clearing buttons 64 disposed on the central portion 54 of the rigid upper section 50 of the inlet hose 14. Preferably, each residue removing button 64 comprises a sleeve 66, a core section 68, a residue removing end 70, an actuating end 72, and a biasing means 74. Further, each sleeve 66 extends through the central portion 54 of the rigid upper section 50 where dirt and debris congregate on the walls of the inlet hose 14. Each sleeve 66 sealably attaches through the wall of the central portion 54 of the rigid upper section 50 so that air cannot pass between the sleeve and the wall of the central portion. A core section 68 having an outer end 76 and an inner end 78 slidably and rotatably mounts through each sleeve 66. Preferably, the biasing means 74 biases the inner end 78 of the core section 68 against the sleeve 66 so that little air or debris may pass between the core section and the sleeve. A residue removing end 70 attaches to the inner end 78 of each core section. Attached to the outer end 76 of each core section 68 is an actuating end 72. The actuating end 72 allows a user to push the core section 68 inwardly within the central portion 54 of the upper section 50 of the inlet hose 14 and rotate the core section. Preferably, each residue removing end 70 has a non-symmetrical shape so that when the central portion 54 is rotated or pushed inwardly, the residue removing end dislodges debris that has accumulated within the inlet hose 14. Thus, the inlet clearing buttons allow a user to clear the inlet hose 14 without requiring that the device be disassembled.

The present invention also includes a method for collecting and exterminating fire ants. The first step of the method requires collecting fire ants and a substantial portion of an associated fire ant mound using a vacuum device 10. A next step includes storing the collected fire ants and the associated fire ant mound in a container 12. A further step includes sealing the container 12 to become air tight. A final step requires removing air from the container 12 to create a vacuum to thereby asphyxiate the collected fire ants.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. An apparatus for capturing and asphyxiating fire ants, the apparatus comprising:
   (a) a container;
   (b) an inlet opening formed in a wall of the container;
   (c) an inlet hose having a first end that is sealably attachable to the inlet opening and a second end opposite the first end;
   (d) a primary vacuum unit sealably attachable to the container operable to create a vacuum within the container causing air to enter the container through the inlet opening and the inlet hose sealably attachable thereto;
   (e) an outlet opening formed on the primary vacuum unit for allowing air to escape from the vacuum unit;
   (f) inlet sealing means for sealing the inlet opening;
   (g) outlet sealing means for sealing the outlet opening:
   (h) a vacuum receiving nipple formed in a wall of the container, the nipple attachable to a secondary vacuum source to allow the secondary vacuum source to reduce the air pressure within the container when the inlet and outlet openings are sealed; and
   (i) nipple sealing means for sealing the vacuum receiving nipple.

2. The apparatus of claim 1 further comprising a digging attachment including:
   (a) a rigid and substantially cylindrically shaped hollow body having a first end that is sealably attachable to the second end of the inlet hose;
   (b) at least one blade extending from a second end of the rigid body; and
   (c) at least one handle attached to the rigid body.

3. The apparatus of claim 1 wherein the inlet hose comprises:
   (a) a hollow and rigid upper section having a first end connected to the inlet opening of the container, a curved central portion, and a second end opposite the first end; and
   (b) a flexible portion having a first end connected to the second end of the rigid upper portion and a second end opposite the first end.

4. The apparatus of claim 3 further comprising a plurality of inlet clearing buttons disposed on the central portion of the rigid upper section of the inlet hose, each residue removing button comprising:
   (a) a sleeve extending through a wall of the rigid upper section;
   (b) a core section slidably and rotatably mounted through the sleeve and having an outer end and an inner end;
   (c) a residue removing end attached to the inner end of the core section;
   (d) an actuating end attached to the outer end of the core section allowing a user to operate the residue removing device; and
   (e) biasing means for biasing the inner end of the core section against the sleeve.

5. A method for capturing and asphyxiating fire ants, the method comprising the steps of:
   (a) collecting fire ants and a substantial portion of an associated fire ant mound using a vacuum device;
   (b) storing the collected fire ants and the associated fire ant mound in a container;
   (c) sealing the container to become air tight; and
   (d) removing air from the container to create a vacuum to thereby asphyxiate the collected fire ants.

* * * * *